United States Patent [19]

Schlund et al.

[11] Patent Number: 5,444,124
[45] Date of Patent: Aug. 22, 1995

[54] COMPATIBILIZED FLUOROPOLYMER/AROMATIC POLYESTER THERMOPLASTIC POLYBLENDS

[75] Inventors: Bruno Schlund, Chaponost; Alain Bouilloux, Bernay, both of France

[73] Assignee: Elf Atochem S.A., Puteaux, France

[21] Appl. No.: 261,703

[22] Filed: Jun. 17, 1994

[30] Foreign Application Priority Data

Jun. 17, 1993 [FR] France .................. 93 07298

[51] Int. Cl.⁶ .............................. C08L 67/02
[52] U.S. Cl. .................. 525/166; 525/199; 525/276; 525/387; 525/405; 525/408; 525/423; 525/438; 525/445; 525/485; 525/530; 525/913
[58] Field of Search ............ 525/166, 199, 931, 530, 525/485, 423, 438, 445, 405, 408, 387, 276

[56] References Cited

U.S. PATENT DOCUMENTS

| | | | |
|---|---|---|---|
| 4,097,548 | 6/1978 | Kulkarni et al. | 525/174 |
| 4,299,930 | 11/1981 | Boggs | 525/174 |
| 4,435,475 | 3/1984 | Sasaki et al. | 525/193 |
| 5,057,345 | 10/1991 | Barrett | 525/193 |
| 5,057,575 | 10/1991 | Chapman, Jr. et al. | 525/179 |
| 5,198,267 | 3/1993 | Aharoni et al. | 427/162 |

FOREIGN PATENT DOCUMENTS 59-210968 11/1984 Japan .
59-213755 12/1984 Japan .
60-262170 12/1985 Japan .

*Primary Examiner*—Robert E. Sellers
*Assistant Examiner*—Randy Gulakowski
*Attorney, Agent, or Firm*—Burns, Doane, Swecker & Mathis

[57] ABSTRACT

Thermoplastic polyblend compositions, well suited for the production of mechanically strong and chemical-resistant shaped articles having a wide variety of chemical engineering and other applications, e.g., for the production of electrical cable for high-frequency electrical transmissions, comprise (i) a fluoropolymer, (ii) an aromatic polyester and (iii) a copolymeric compatibilizing agent therefor, the compatibilizing copolymer (iii) comprising the copolymerizate of ethylene, a glycidyl acrylate, an acrylic comonomer and, optionally, a peroxy comonomer.

12 Claims, No Drawings

COMPATIBILIZED FLUOROPOLYMER/AROMATIC POLYESTER THERMOPLASTIC POLYBLENDS

BACKGROUND OF THE INVENTION

1. Field of the Invention

The present invention relates to thermoplastic polyblends based on fluoropolymers and aromatic polyesters, and comprising a compatibilizing agent therefor.

This invention especially relates to compatibilizing agents comprising copolymers of ethylene, glycidyl acrylate and an acrylate, for thermoplastic resins based on fluoropolymers, notably polyvinylidene fluoride, and on aromatic polyesters, notably a polyterephthalate.

2. Description of the Prior Art

It is known to this art that fluoropolymers have very good mechanical properties, excellent thermal and weathering behavior and markedly good chemical inertness and resistance.

However, because of their high density, the complexity of the applications thereof and their high cost, it has been proposed to combine them with other polymers, in particular, to polyblend same with aromatic polyesters, whose good mechanical, electrical, chemical and thermal properties are also known to this art.

Such blends, comprising fluoropolymers and aromatic polymers, have mechanical properties which provide little satisfaction. In particular, their low elongation at break and their mediocre impact strength are a result of poor adhesion between the fluoropolymer phase and the aromatic polyester phase.

To improve the mechanical properties of such blends, a compatibilizing agent must be added thereto to promote cohesion between the phases.

FR-2,389,658 describes thermoplastic blends based on fluoropolymers and aromatic polyesters which contain a compatibilizing agent. The compatibilizing agent is a block copolymer of an intermediate polymer block of a conjugated diene which is endblocked with a polymer block of a monoalkenylarene. The presence of the compatibilizing agent permits an alloy to be obtained which has a more homogeneous appearance but which, disadvantageously, does not exhibit any improvement in the elongation at break. Moreover, it is necessary to incorporate at least 30% of compatibilizing agent into the blend in order to provide an increase in the impact strength.

SUMMARY OF THE INVENTION

Accordingly, a major object of the present invention is the provision of novel fluoropolymer/aromatic polyester thermoplastic polyblends which have good properties of elongation at break and impact strength.

Another object of this invention is the provision of novel thermoplastic polyblends that are well suited for the production of shaped articles having a wide variety of chemical engineering applications, and which can withstand highly aggressive chemical environments. The subject polyblends also have dielectric properties which permit their use for electrical cable manufacturing, especially in respect of high-frequency electrical transmissions.

Briefly, the thermoplastic polyblends according to the present invention comprise a fluoropolymer, an aromatic polyester and a copolymeric compatibilizing agent thereof, said compatibilizing copolymer comprising recurring structural units of the formulae:

 (I)

and

 (II)

and

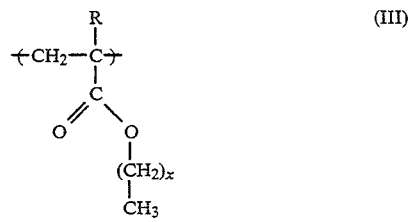 (III)

and, optionally,

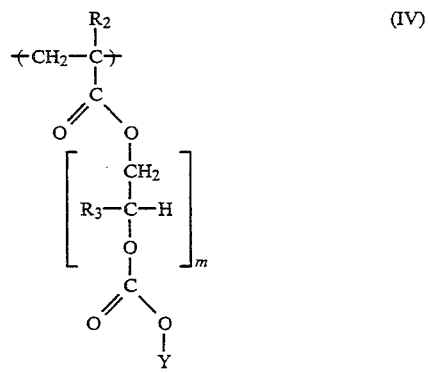 (IV)

and/or

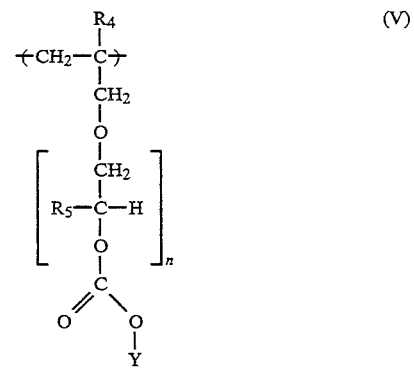 (V)

in which R and $R_2$ are each a hydrogen atom or an alkyl radical having 1 or 2 carbon atoms;

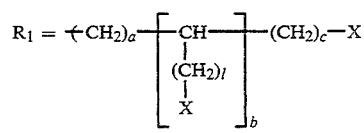

wherein X is $CH_3$ or

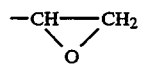

and at least one X is

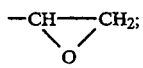

a is a number ranging from 1 to 10; b is 0 or 1; c is a number ranging from 0 to 10; and l is a number ranging from 0 to 10; $R_3$ and $R_5$ are each a hydrogen atom or a methyl radical; $R_4$ is a hydrogen atom or an alkyl radical having from 1 to 4 carbon atoms; m is 1 or 2; n is 0, 1 or 2; x is a number ranging from 0 to 10; and Y is a hydrogen atom or a radical:

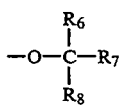

in which $R_6$ and $R_7$, which may be identical or different, are each an alkyl having from 1 to 4 carbon atoms, and $R_8$ is an alkyl radical having from 1 to 12 carbon atoms, or a phenyl, alkylphenyl or cycloalkyl radical having from 3 to 12 carbon atoms; or else Y is

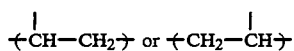

(Ia)

or

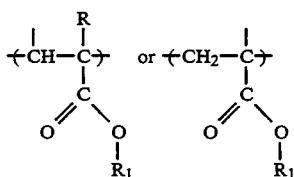

(IIa)

or

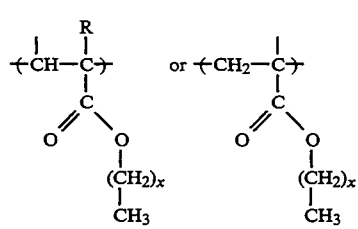

(IIIa)

or

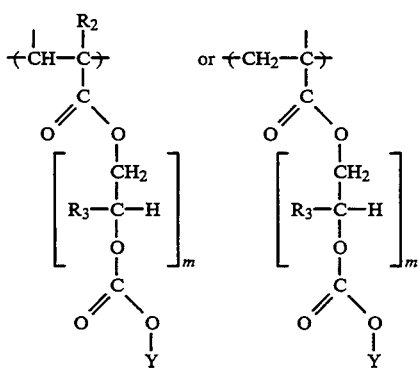

(IVa)

-continued or

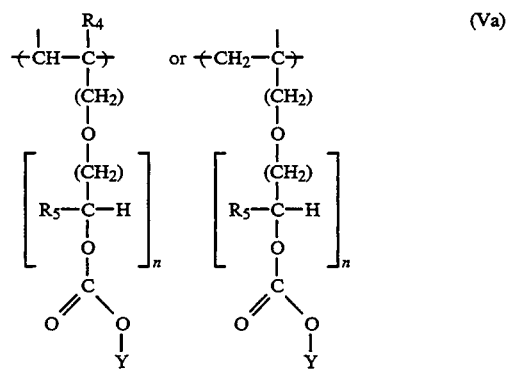

(Va)

with the proviso that the amount of said structural units of formulae (Ia), (IIa), (IIIa), (IVa) and (Va) is such that the thermoplasticity of the final polyblends is not compromised or adversely affected, and said structural units of formulae (Ia), (IIa), (IIIa), (IVa) and (Va) may be directly bonded to structural units of formulae (I), (II),- (III), (IV) or (V).

DETAILED DESCRIPTION OF BEST MODE AND PREFERRED EMBODIMENTS OF THE INVENTION

More particularly according to the present invention, the subject compatibilizing agents advantageously have a molecular weight ranging from 5,000 to $1 \times 10^8$ and preferably from $1 \times 10^4$ to $1 \times 10^6$.

The compatibilizing agents according to The invention advantageously comprise (a) from 29% to 70% and preferably from 40% to 65% by weight of the structural units of formula (I), (b) from 0.5% to 30% and preferably from 1% to 15% by weight of the structural units of formula (II), (c) from 10% to 70% and preferably from 10% to 55% by weight of the structural units of formula (III), and (d) from 0% to 10% by weight of the structural units of formula (IV) and/or (V).

Exemplary monomers that polymerize into the recurring structural units of formula (II) are the glycidyl acrylate monomers of the formula:

(VI)

in which R and $R_1$ are as defined above.

Advantageously, this monomer is glycidyl methacrylate.

Exemplary monomers that polymerize into the recurring structural units of formula (III) are the acrylate monomers of the formula:

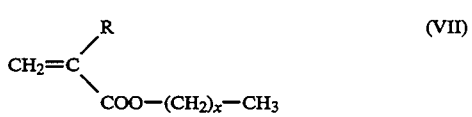

(VII)

in which R and x are as defined above.

Advantageously, this monomer is ethyl acrylate or methyl methacrylate.

And exemplary comonomers that polymerize into the recurring structural units of the formula (IV) and (V) are the peroxy compounds of the formulae:

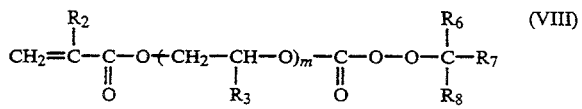

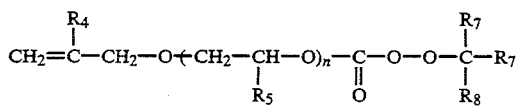

in which $R_2$, $R_3$, $R_4$, $R_5$, $R_6$, $R_7$, $R_8$, m, and n are as defined above.

The compatabilizing agents of the polyblends of the invention, which comprise recurring structural units of the formulae (I), (II) and (III), are advantageously prepared via free-radical copolymerization under high pressure. This entails reacting the comonomers at a temperature ranging from 50° to 300° C. under a pressure of from 500 to 3,000 bars, in the presence of initiators of the organic peroxide type. The amount of copolymerization initiators typically ranges from 0.0001% to 0.1% by weight, relative to the total weight of the comonomer charge.

When the compatibilizing agents of the polyblends of the invention also comprise structural units of formula (IV) and/or (V), they are advantageously prepared by:
(i) providing a copolymer comprising the recurring structural units of formulae (I) and (II) or (III), or a terpolymer comprising the recurring structural units of the formulae (I) and (II) and (III), via free-radical polymerization under high pressure,
(ii) contacting the polymer thus obtained with a solution comprising the monomer(s) of formula (VI) and/or (VII), the monomer(s) of formula (VIII) and/or (IX), a peroxide polymerization initiator and a transfer agent in a reactor which is maintained at a temperature of from 60° C. to 85° C. for several hours, and
(iii) extruding the product thus obtained, after a washing with water and a drying of same, in an extruder which has been heated to a temperature of approximately 200° C.

The fluoropolymer of the polyblends according to the invention is advantageously a polyvinylidene fluoride. Exemplary of such fluoropolymers are the homopolymers and copolymers containing at least 50 mol % of vinylidene fluoride recurring structural units ($VF_2$). Preferred are polyvinylidene fluoride (PVDF) and copolymers of vinylidene fluoride and chlorotrifluoroethylene ($VF_2$—$C_2F_3Cl$) or of vinylidene fluoride and hexafluoropropene ($VF_2$—$C_2F_6$) containing from 0.1% to 30% of $C_2F_3Cl$ or $C_3F_6$ and preferably from 2% to 15%.

The aromatic polyester of the polyblends of the invention is advantageously a polyterephthalate. Exemplary thereof are polyethylene terephthalate (PETP), polypropylene terephthalate (PPTP), and polybutylene terephthalate (PBTP). Preferably, the aromatic polyester is PETP or PBTP.

The thermoplastic polyblends according to the invention advantageously comprise from 2 to 20 parts by weight of compatibilizing agent per 100 parts by weight of the mixture of from 51 to 90 parts by weight of fluoropolymer and from 10 to 49 parts by weight of aromatic polyester.

The present invention also features a process for the preparation of the subject thermoplastic polyblends. This process entails mixing the fluoropolymer, the aromatic polyester and the compatibilizing agent, as described above, in an extruder which has been heated to a temperature which is sufficient to melt the constituents of the mixture and to form granules thereof.

The extrusion temperatures generally range from 50° to 180° C. in the feed zone and from 220° to 280° C. at the die outlet. The preferred temperatures are 175° and 240° C., respectively.

In a preferred embodiment of the invention, the fluoropolymer, the aromatic polyester and the compatibilizing agent are in the form of granules. The constituents are mixed, manually or mechanically and then the mixture is extruded.

The granules of thermoplastic polyblend according to the invention which are obtained after extrusion can be used in any type of conversion or transformation, such as the manufacture of expanded or nonexpanded tubes, films, sheets or (injection)molded components and shaped articles.

The mechanical characteristics of the polyblends of the invention which were determined are the tensile strength, the flexural strength, the impact strength and the pliability.

The tensile tests are carried out on test specimens cut using a hollow punch from a sheet of average thickness 0.8 mm which was compression-molded at 230° C. The shape of the test specimens corresponds to the standard ASTM D 1708 and the tensile tests are carried out according to the standard ASTM D 638.

The flexural tests are carried out according to the standard ISO R 178 on test specimens which are injection-molded at 240° C.

The impact strength tests are carried out on notched bars according to the standard ASTM 256.73.

The pliability is measured on an extruded rod 10 cm in length and 3 mm in diameter. This rod is notched at its mid-point around the circumference to a depth of 0.1 mm, using a cutting tool. Pliability is effective when, folded 180°, the rod does not rupture.

The physico-chemical measurements carried out on the blends according to the invention are their permeability to water vapor and volume shrinkage.

The permeability to water vapor is measured at 80° C. according to the standard NFT 00-030.

The volume shrinkage is measured using a calibrated mold having a circular cross-section of 5 cm in diameter and 4 mm in thickness, which is filled with material melted under the press at 230° C. During cooling, the shrinkage of the blend is determined by measuring the average diameter and thickness of the disc. The difference in volume between the mold and the disc is expressed in %.

Among the dielectric characteristics of the blends according to the invention, the permittivity and dissipation factor (tangent δ) are determined. The measurements are carried out according to the standard ASTM D 150.

In order to further illustrate the present invention and the advantages thereof, the following specific examples are given, it being understood that same are intended only as illustrative and in nowise limitative.

In said examples to follow, the proportion by weight of the compatibilizing agent copolymer is expressed in % of the weight of the mixture of the fluoropolymer and the aromatic polymer. The proportion of monomer recurring structural units are expressed in % by weight of the compatibilizing agent.

EXAMPLE 1

A mixture was prepared containing 72.2% by weight of polyvinylidene fluoride (PVDF) and 27.8% of polybutylene terephthalate (PBTP), which was dried beforehand overnight at 110° C. The mixture was admixed with 11.1% of compatibilizing agent, i.e., the copolymer comprising 59.5% of ethylene monomer recurring units [unit (I)], 10.5% of glycidyl methacrylate monomer recurring units [unit (II)], 29.6% of methyl methacrylate monomer recurring units [unit (III)] and 0.4% of peroxy monomer recurring units [unit (IV) and/or (V)], for example Modiper 4.200 ®.

The flow index of this polymer, measured according to the standard ISO 1133, ranged from 0.2 to 5 g/10 minutes (2.16 kg at 190° C.).

The constituents of the mixture were in granular form. The mixture was extruded using an extruder whose screw possessed a shear zone which was provided for the production of granules (compounding). The extrusion temperatures were 175° C. at the inlet and 240° C. at the die outlet. The extruded granules obtained were melted or transformed into sheets, bars or test specimens according to the requirements of the various tests. The characteristics of the thermoplastic blend obtained after extrusion are reported in the following Table.

EXAMPLE 2

According to the procedure of Example 1, a mixture containing 72.2% by weight of PVDF and 27.8% of PBTP was extruded. This mixture was admixed with 11.1% by weight of compatibilizing agent, i.e., the copolymer comprising 67% of ethylene monomer recurring units [unit (I)], 8% of glycidyl methacrylate monomer recurring units [unit (II)] and 25% of ethyl acrylate monomer recurring units [unit (III)].

The flow index of this polymer, measured according to the standard ISO 1133, ranged from 4 to 8 g/10 minutes (2.16 kg at 190° C.).

The characteristics of the thermoplastic blend obtained after extrusion are reported in the following Table.

EXAMPLE 3

According to the procedure of Example 1, a mixture was extruded which contained 72.2% by weight of $VF_2$—$C_2F_3Cl$ copolymer containing 2% of $C_2F_3Cl$ monomer recurring units, and 27.8% of PBTP, which was admixed with 11.1% by weight of the compatibilizing agent of Example 1.

The characteristics of the thermoplastic blend obtained after extrusion are reported in the following Table.

EXAMPLE 4

According to the procedure of Example 1, a mixture was extruded containing 72.2% by weight of $VF_2$—$C_2F_3Cl$ copolymer containing 8% of $C_2F_3Cl$ monomer recurring units, and 27.8% of PBTP, which was admixed with 11.1% of the compatibilizing agent of Example 1.

The characteristics of the thermoplastic blend obtained after extrusion are reported in the following Table.

EXAMPLE 5

According to the procedure of Example 1, a mixture was extruded containing 51.0% by weight of PVDF and 49.0% of PBTP, which was admixed with 20% by weight of the compatibilizing agent of Example 1.

The characteristics of the thermoplastic blend obtained after extrusion are reported in the following Table.

EXAMPLE 6 (Comparative)

According to the procedure of Example 1, a mixture was extruded containing 72.2% by weight of PVDF and 27.8% of PBTP, which was admixed with 11.2% by weight of polymethyl methacrylate (PMMA).

The characteristics of the thermoplastic blend obtained after extrusion are reported in the following Table.

EXAMPLE 7 (Comparative)

According to the procedure of Example 1, a mixture was extruded containing 72.2% by weight of PVDF and 27.8% of PBTP, which was admixed with 11.1% by weight of a copolymer containing 60% of butyl acrylate monomer recurring units and 40% of methyl methacrylate monomer recurring units.

The characteristics of the thermoplastic blend obtained after extrusion are reported in the following Table.

EXAMPLE 8 (Comparative)

According to the procedure of Example 1, a mixture was extruded containing 100% by weight of PVDF and 15.3% by weight of PMMA.

The characteristics of the thermoplastic blend obtained after extrusion are reported in the following Table.

EXAMPLE 9 (Comparative)

According to the procedure of Example 1, a mixture was extruded containing 100% by weight of PVDF, which was admixed with 15.3% by weight of the compatibilizing agent of Example 2.

The characteristics of the thermoplastic blend obtained after extrusion are reported in the following Table.

EXAMPLE 10 (Comparative)

PBTP was extruded according to the procedure of Example 1.

The characteristics of the material obtained are reported in the following Table.

EXAMPLE 11 (Comparative)

PVDF was extruded according to the procedure of Example 1.

The characteristics of the material obtained are reported in the following Table.

EXAMPLE 12 (Comparative)

A mixture was extruded containing 65% by weight of PVDF and 35% of PBTP, according to the procedure of Example 1.

The characteristics of the thermoplastic blend obtained are reported in the following Table.

EXAMPLE 13 (Comparative)

Polyethylene terephthalate (PETP) was extruded according to the procedure of Example 1.

The characteristics of the thermoplastic resin obtained are reported in the following Table.

EXAMPLE 14

According to the procedure of Example 1, a mixture was extruded containing 72.2% by weight of PVDF and 27.8% of PETP, which was admixed with 11.1% by weight of the compatibilizing agent of Example 1.

The characteristics of the thermoplastic blend obtained after extrusion are reported in the following Table.

EXAMPLE 15 (Comparative)

According to the procedure of Example 1, a mixture was extruded containing 65% by weight of PVDF and 35% of PETP.

The characteristics of the thermoplastic blend obtained after extrusion are reported in the following Table.

EXAMPLE 16

According to the procedure of Example 1, a mixture was extruded containing 72.2% by weight of PVDF and 27.8% of PETP, which was admixed with 11.1% by weight of the compatibilizing agent of Example 2.

The characteristics of the thermoplastic blend obtained after extrusion are reported in the following Table.

EXAMPLE 17 (Comparative)

According to the procedure of Example 1, a mixture was extruded containing 72.2% by weight of PVDF and 27.8% of PETP, which was admixed with 11.1% by weight of PMMA.

The characteristics of the thermoplastic blend obtained after extrusion are reported in the following Table.

TABLE

| EXAMPLE | 1 | 2 | 3 | 4 | 5 | 6c | 7c | 8c |
|---|---|---|---|---|---|---|---|---|
| Mechanical Properties Tensile test on test specimens: ASTM D1708 | | | | | | | | |
| Threshold stress (MPa) | 39 | 34 | 36 | 27 | 33 | 37 | 33 | 40.7 |
| Threshold elongation (%) | 9 | 14 | 12 | 11 | 11.7 | 4 | 4 | 6 |
| Stress break (MPa) | 35 | 34 | 31 | 29 | 39.2 | 37 | 33 | 48.1 |
| Elongation at break (%) | 230 | 20 | 150 | 250 | 245 | 4 | 4 | 380 |
| Tensile test on extruded rod Elongation at Break (%) | 61 | 35 | — | — | — | 25 | — | — |
| Notched IZOD impact (J/m) | 75 | 75 | 70 | — | — | — | 37 | — |
| Pliability with notch induction | Yes | Yes | — | — | — | No | — | — |
| Dielectric properties | | | | | | | | |
| at $10^2$ Hz permittivity: $\epsilon$ | 6.29 | 6.44 | 6.42 | 6.54 | — | — | — | — |
| tangent delta: tg $\delta$ | 0.032 | 0.026 | 0.036 | 0.046 | — | — | — | — |
| at $10^3$ Hz permittivity: $\epsilon$ | 5.99 | 6.11 | 6.13 | 6.29 | — | — | — | — |
| tangent delta | 0.018 | 0.012 | 0.020 | 0.026 | — | — | — | — |
| at $10^4$ Hz permittivity: $\epsilon$ | 5.77 | 5.93 | 5.91 | 5.91 | — | — | — | — |
| tangent delta | 0.017 | 0.014 | 0.019 | 0.024 | — | — | — | — |
| at $10^5$ Hz permittivity: $\epsilon$ | 5.69 | 5.75 | 5.71 | 5.65 | — | — | — | — |
| tangent delta | 0.047 | 0.049 | 0.048 | 0.056 | — | — | — | — |
| at $10^6$ Hz permittivity: $\epsilon$ | 4.94 | 5.05 | 5.01 | 4.93 | — | — | — | — |
| tangent delta | 0.126 | 0.135 | 0.132 | 0.133 | — | — | — | — |
| Volume shrinkage 230° C. → 23° C. | 3.3 | — | — | — | — | — | — | — |
| Permeability to water vapor (g/m²/d) | 80.3 | — | 80.3 | 90.7 | — | — | — | — |

| EXAMPLE | 9c | 10c | 11c | 12c | 13c | 14 | 15c | 16 | 17c |
|---|---|---|---|---|---|---|---|---|---|
| Mechanical Properties Tensile test on test specimens: ASTM D1708 | | * | | * | ** | | ** | | * |
| Threshold stress (MPa) | 24 | — | 50 | | | 40 | | 29 | |
| Threshold elongation (%) | 5 | — | 9 | | | 5 | | 3.4 | |
| Stress at break (MPa) | 24 | — | 60 | | | 10 | | 29 | |
| Elongation at break (%) | 5 | — | 250 | | | 5 | | 3.4 | |
| Tensile test on extruded rod Elongation at Break (%) | — | — | 0 | — | — | — | — | — | — |
| Notched IZOD impact (J/m) | | 2 | 140 | 33 | — | — | — | — | — |
| Pliability with notch induction | — | — | No | — | — | — | — | — | — |
| Dielectric properties | | | | | | | | | |
| at $10^2$ Hz permittivity: $\epsilon$ | — | 3.5 | 9.29 | 5.88 | — | — | — | — | — |
| tangent delta: tg $\delta$ | — | 0.001 | 0.131 | 0.616 | — | — | — | — | — |
| at $10^3$ Hz permittivity: $\epsilon$ | — | 3.55 | 9.21 | 5.75 | — | — | — | — | — |
| tangent delta | — | 0.002 | 0.017 | 0.009 | — | — | — | — | — |
| at $10^4$ Hz permittivity: $\epsilon$ | — | 3.37 | 8.77 | 5.68 | — | — | — | — | — |
| tangent delta | — | 0.006 | 0.019 | 0.010 | — | — | — | — | — |
| at $10^5$ Hz permittivity: $\epsilon$ | — | 3.33 | 8.44 | 5.5 | — | — | — | — | — |
| tangent delta | — | 0.014 | 0.065 | 0.036 | — | — | — | — | — |
| at $10^6$ Hz permittivity: $\epsilon$ | — | 3.23 | 7.04 | 4.98 | — | — | — | — | — |
| tangent delta | — | 0.025 | 0.201 | 0.114 | — | — | — | — | — |
| Volume shrinkage 230° C. → 23° C. | — | 2.6 | 6.1 | — | — | — | — | — | — |
| Permeability to water vapor (g/m²/d) | — | — | 110.7 | 135 | — | — | — | — | — | c: comparative example
—: not determined
*: no elongation, immediate break
**: product not moldable

What is claimed is:

1. A thermoplastic polyblend composition, which comprises (i) a fluoropolymer, (ii) an aromatic polyester and (iii) a copolymeric compatibilizing agent therefor, said compatibilizing copolymer (iii) comprising recurring structural units of the formulae:

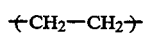  (I)

and

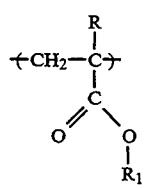  (II)

and

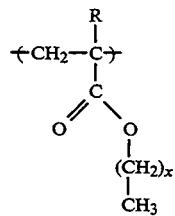  (III)

and, optionally,

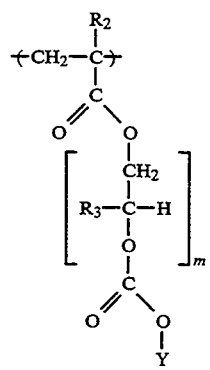  (IV)

and/or

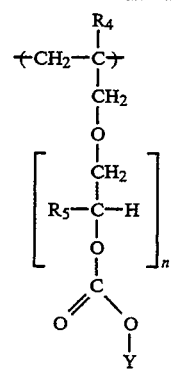  (V)

in which R and $R_2$ are each a hydrogen atom or an alkyl radical having 1 or 2 carbon atoms;

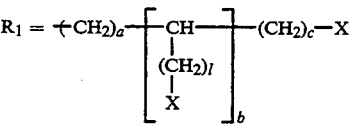

wherein X is $CH_3$ or

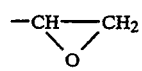

and at least one X

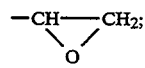;

a is a number ranging from 1 to 10; b is 0 or 1; c is a number ranging from 0 to 10; and 1 is a number ranging from 0 to 10; $R_3$ and $R_5$ are each a hydrogen atom or a methyl radical; $R_4$ is a hydrogen atom or an alkyl radical having from 1 to 4 carbon atoms; m is 1 or 2; n is 0, 1 or 2; x is a number ranging from 0 to 10; and Y is a hydrogen atom or a radical:

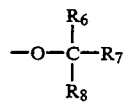

in which $R_6$ and $R_7$, which may be identical or different, are each an alkyl having from 1 to 4 carbon atoms, and $R_8$ is an alkyl radical having from 1 to 12 carbon atoms, or a phenyl, alkylphenyl or cycloalkyl radical having from to 12 carbon atoms; or else Y is

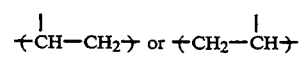  (Ia)

or

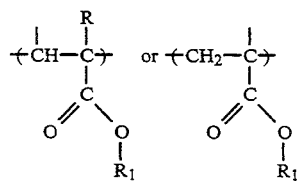

or

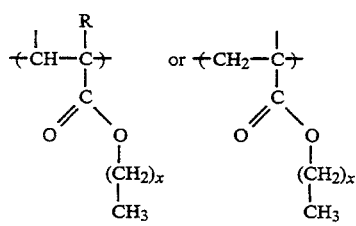

or

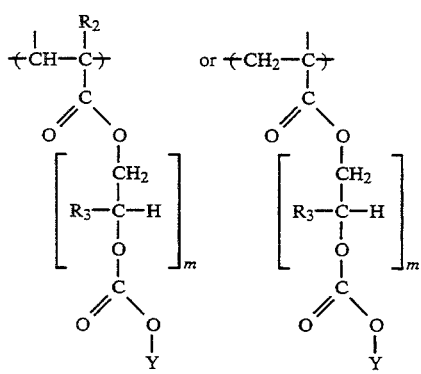

or

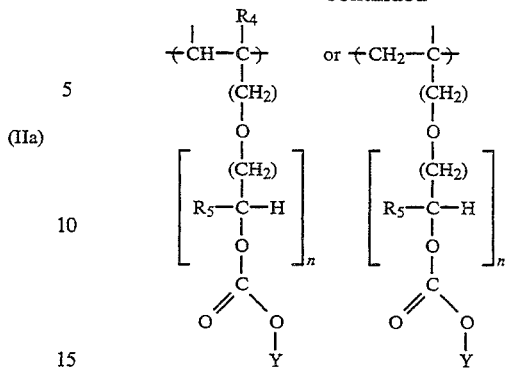

with the proviso that the amount of said structural units of formulae (Ia), (IIa), (IIIa), (IVa) and (Va), when present, is such that the thermoplasticity of the polyblend is maintained, and said structural units of formulae (Ia), (IIa), (IIIa), (IVa) and (Va) may be directly bonded to structural units of formulae (I), (II), (III), (IV) or (V).

2. The polyblend composition as defined by claim 1, said compatibilizing copolymer (iii) comprising (a) from 29% to 70% by weight of recurring structural units of the formula (I), (b) from 0.5% to 30% by weight of recurring structural units of the formula (II), (c) from 10% to 70% by weight of recurring structural units of the formula (III), and (d) from 0% to 10% by weight of recurring structural units of the formula (IV) and/or (V).

3. The polyblend composition as defined by claim 1, said fluoropolymer (i) comprising a polyvinylidene fluoride.

4. The polyblend composition as defined by claim 3, said polyvinylidene fluoride comprising a homopolymer or copolymer containing at least 50 mol % of vinylidene fluoride recurring structural units.

5. The polyblend composition as defined by claim 4, said polyvinylidene fluoride comprising a vinylidene fluoride/chlorotrifluoroethylene copolymer.

6. The polyblend composition as defined by claim 4, said polyvinylidene fluoride comprising a vinylidene fluoride/hexafluoropropene copolymer.

7. The polyblend composition as defined by claim 1, said aromatic polyester (ii) comprising a polyalkylene terephthalate.

8. The polyblend composition as defined by claim 3, said aromatic polyester (ii) comprising a polyalkylene terephthalate.

9. The polyblend composition as defined by claim 8, said polyalkylene terephthalate comprising polyethylene terephthalate, polypropylene terephthalate or polybutylene terephthalate.

10. The polyblend composition as defined by claim 1, comprising from 2 to 20 parts by weight of said compatibilizing copolymer (iii) per 100 parts by weight of said fluoropolymer (i) and said aromatic polyester (ii).

11. The polyblend composition as defined by claim 10, comprising from 51 to 90 parts by weight of said fluoropolymer (i) and from 10 to 49 parts by weight of said aromatic polyester (ii).

12. The polyblend composition as defined by claim 1, in granular state.

* * * * *